United States Patent Office 3,426,942
Patented Feb. 11, 1969

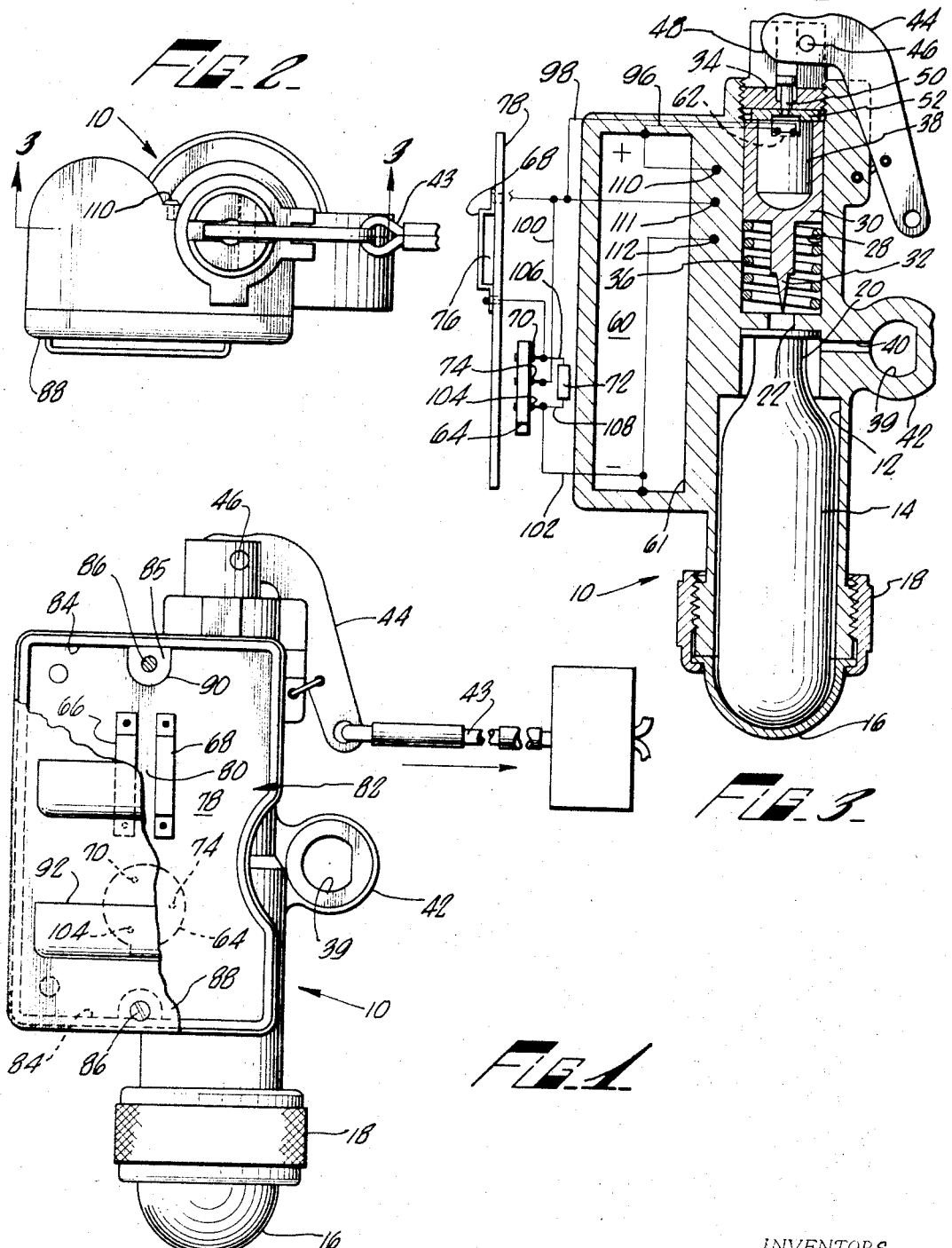

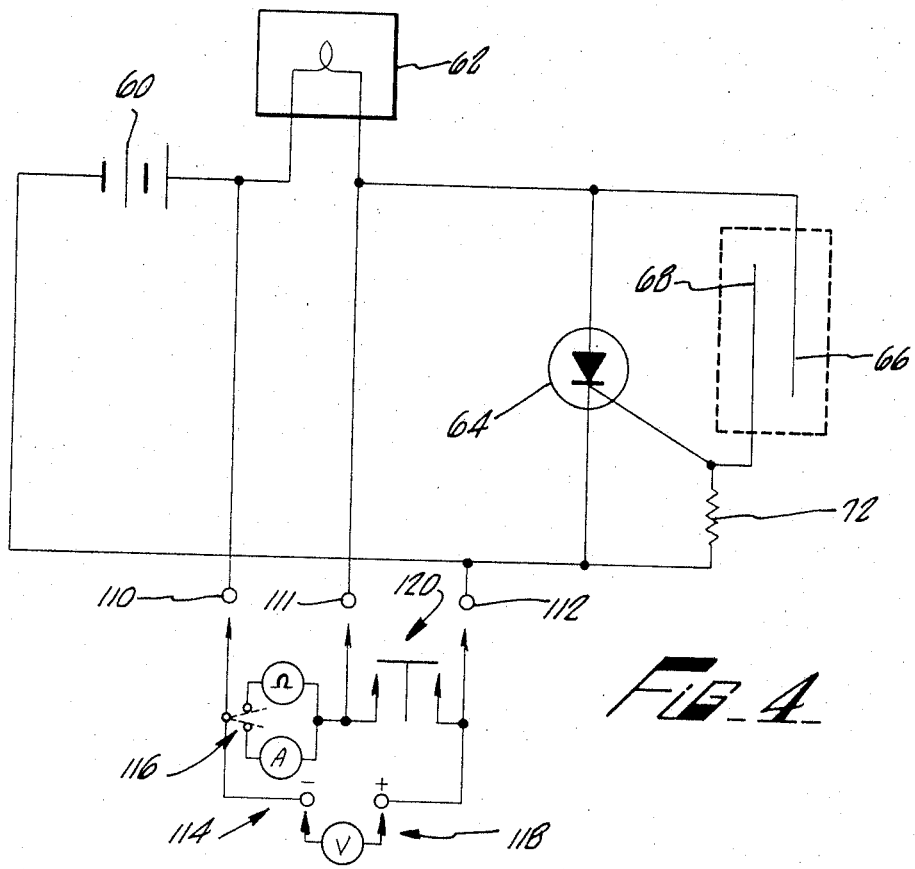
*FIG_4*
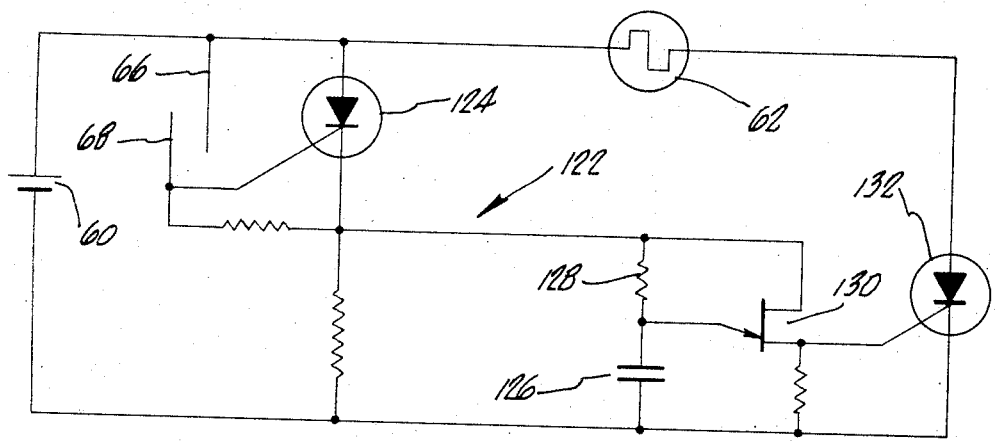
*FIG_5*
INVENTORS.
BILLY D. McMAINS.
MARVIN L. FRIEDMAN
BY
Christie, Parker & Hale
ATTORNEYS.

3,426,942
WATER-RESPONSIVE ENERGIZING APPARATUS
Billy D. McMains, Garden Grove, and Marvin L. Friedman, Beverly Hills, Calif., assignors to Jay-El Products, Inc., Gardena, Calif., a corporation of California
Filed July 31, 1967, Ser. No. 657,205
U.S. Cl. 222—5
Int. Cl. B67d 5/08, 7/24; B63c 9/18
10 Claims

ABSTRACT OF THE DISCLOSURE

Energizing apparatus having a source of electric power, and a pair of spaced-apart conductors that withdraw water droplets unintentionally accumulating in the space between them and which trigger a thyristor switch when they become immersed in water. The thyristor switch then closes an electric circuit whereby the energizing apparatus becomes activated. Terminals are provided to functionally test the components of the apparatus. Optionally, a time-delay circuit is included in the apparatus.

Background of the invention

The present invention relates to water-responsive energizing apparatus.

Although the water-responsive energizing apparatus of the present invention can be used in a number of devices which are actuated responsive to contact with water, it is described, for purposes of illustration, with particular reference to emergency equipment actuators. Equipment of the type that becomes energized upon contact with water has long been known. Aside from being provided with means to manually operate the actuator, whether in contact with water or not, these actuators are frequently provided with means to automatically operate upon contact with the water. They are attached to emergency equipment, such as life vests or life rafts, and are to inflate them. In the prior art, water-responsive electrical devices have been used to energize these actuators. Most commonly, an electrical circuit is closed in order to detonate an explosive charge which in turn causes pressurized gas to inflate the emergency equipment. Such devices include water activated batteries, water decomposing contact separators, conductive water-decomposing pellets, and electrical sensing plates that are spaced apart in order to break the circuit. An insulating member is placed between the plates, which member becomes a conductor upon being sufficiently moisturized, such as upon immersion in water. A recurring problem with these devices is that atmospheric humidity tends to destroy the components or moisturize the insulator between the sensing plates to an extent sufficient to cause some exchange of electrons. This electron exchange is a drain on the power supply, typically a conventional battery, with the result that a prolonged drain may completely discharge the battery and render the automatic device inoperative. There have been instances in which high atmospheric humidity has moisturized the insulating member to a degree that an electric current strong enough to detonate the explosive charge has passed through the insulating member.

In the past, considerable uncertainty existed as to whether or not an emergency energizing apparatus was in an operating condition. After extended periods of time there is not only the danger that the battery becomes drained or inoperative, but the various components such as a squib used for detonating the explosive charge, the conductor plates, or the circuit components might become faulty. No testing provisions for the electric functions of the device were available and units were tested on a random basis by submerging some of them in water. Where human lives might be in danger, random procedures are never satisfactory.

Presently available water-responsive emergency actuators which require a time delay in their response after being inserted in water include gas escape mechanisms, time-delay fuses or initiator fuses, all of which are relatively inaccurate, subject to failure and cannot be functionally tested without destroying them. Such delaying actuators are often employed where a person using it must first position himself in the water. An example of such equipment is one-man emergency rafts frequently strapped to parachuting aircraft pilots.

These undesirable side effects require frequent replacement of the whole actuator when certainty of its operability is a necessity. When replacements are not carried out, for one reason or another, there is a danger that the actuator will malfunction at the time of an emergency when it is most needed.

Summary of the invention

Generally speaking, this invention provides a water-responsive energizing apparatus having an electrically activated means for actuating emergency equipment. It includes a source of electric power and a pair of spaced-apart conductor plates in electric connection with the soure of electric power and which are mounted on an insulating base. A thyristor switch connects the electrically activated means with the power source in response to immersing the conductor plates in water.

The apparatus includes test terminals for testing the responsiveness of the electrically activated means, for testing the electric function of the conductor plates when immersed in water, and for testing the adequacy of the electric power source without energizing the means for activating the emergency equipment. Optionally, the apparatus further includes time-delay means for delaying activation of the emergency equipment for a predetermined period of time after the conductor plates have been immersed in water.

The conductor plates are constructed to minimize the electron-flow between the plates while the apparatus is not submerged in water to substantially reduce or eliminate a drain of the power source during storage of the apparatus. The conductor plates are therefore preferably constructed of dissimilar metals which are connected with the power source to oppose the potential of the power source. Portions of the conductor plates are spaced from the insulating base such that any water droplets accumulating between the conductor plates are withdrawn by capillary action. The danger of accidentally triggering the emergency actuator by water accumulating between the plates is thereby substantially reduced or eliminated. This assures proper functioning of the apparatus even when it is stored in a highly humid atmosphere. Moreover, the danger of its malfunctioning due to a drained power source is substantially reduced even after relatively long storage times.

The inclusion of a thyristor switch insures proper functioning of the apparatus when it becomes immersed in water since it is no longer necessary to have the full activating current flow between the conductor plates. The conductor plates are merely a sensing device which triggers the main actuating circuit by firing the thyristor switch. It is therefore possible to construct the necessary device substantially more sensitive than was possible in the past when the sensing device had to be constructed to insure flow of an electric current sufficient to activate the means for actuating the emergency equipment. For a number of reasons this transformation was not always successful, resulting in relatively frequent failures of the emergency equipment actuator.

The inclusion of test terminals for the first time enables the functional testing of emergency equipment emergency apparatus without actually triggering it. Since such equipment can only be actuated once, its operativeness could heretofore not be tested. Instead, random samples had to be used. This invention, however, permits the functional testing of the apparatus without actuating it. Periodic checks of each and every apparatus can be made, thus assuring its operativeness in case of an emergency.

Where an apparatus having a time-delay function is required, this invention provides electric circuitry which positively delays activation of the emergency actuator for a predetermined period of time. The time-delay circuit can be functionally tested in a manner similar to the main actuating circuit to assure its proper state of readiness in case of an emergency.

The apparatus of this invention is highly economical to manufacture since it uses widely available, mass produced, and relatively inexpensive components. It combines highest reliability with minimum cost.

*Brief description of the drawings*

FIG. 1 is a plan view of the presently preferred embodiment of an actuator utilizing the invention with parts broken away to show details of the electrical components;

FIG. 2 is an end view of the actuator;

FIG. 3 is a sectional view taken along lines 3—3 of FIG. 2 with the electrical components lifted out of the body to show their interconnection with the battery and the pyrotechnic device;

FIG. 4 is a schematic view of the electrical circuit including a test circuit; and FIG. 5 is a schematic view of the electric circuit provided with a time-delay circuit.

*Description of the preferred embodiment*

To aid in the understanding of the invention, a brief description is first given of the structure and operation of a conventional and known emergency actuator which, as will be seen below, can be automatically energized by the water-responsive energizing apparatus of the invention. Reference is made to U.S. Patent 3,059,814, granted on Oct. 23, 1962, to E. E. Poncel et al., for a more detailed description of the known portion of the emergency actuator.

Referring first to FIG. 3, a main body 10 is provided with a cylindrical cartridge chamber 12 in which a cartridge 14 is slidably inserted and secured by means of a cap 16 and a knurled nut 18. The chamber 12 is arranged to locate the cartridge neck 20 concentrically with a bore 22 which interconnects the chamber 12 with a piston chamber 28. The piston chamber 28 slidably receives a piston 30 that is provided with a piercing pin 32. The end of the chamber 28 opposite the bore 22 is closed with a cap 34. The piston 30 is at all times biased against the cap 34 by a coil spring 36. Piston 30 is additionally provided with a pyrotechnic device 38 located at the end of piston 30 opposite the piercing pin 32. The chamber 12 is provided with an outlet 40 to connect it with a passage 39 in cylindrical boss 42, the cylindrical boss 42 being suitably attached to emergency equipment (not shown) to be inflated. Detonation of the pyrotechnic device 38 causes the piston 30 to be driven in the direction of the cartridge 14, and piercing pin 32 enters the cartridge at the neck 20. The coil spring 36 thereafter forces the piston 30 back into its original position and compressed gas contained in the cartridge 14 is free to escape through the pierced hole, the outlet 40, and the passage 39 to the emergency equipment, thus inflating it. The actuator may further be manually operated by pulling a flexible string 43 (FIG. 1) which pivots a lever 44 around a pin 46, causing a cam edge 48 of the lever to engage a stem 50. By continuing the rotation of the lever 44, the stem 50 that is attached to a driving disc 52, again forces the piston 30 toward the cartridge 14 whereby pin 32 pierces the neck 20.

FIGS. 3 and 4 show the electrical arrangement utilized to cause detonation of the pyrotechnic device 38 when the actuator becomes immersed in water. It includes a suitable power supply, such as a conventional and commercially available battery 60, mounted in a semi-cylindroid internal cavity 61 of the body 10 wherein suitable leads connect the positive terminal of that battery with a squib or detonating device 62 contained in the pyrotechnic device 38. The negative terminal of the battery 60 is connected to the second terminal of the squib, but the circuit is interrupted by a thyristor switch 64. Appropriately connected to the thyristor switch are two spaced-apart conductor plates 66 and 68. In the presently preferred embodiment of this invention the thyristor switch 64 is a silicon controlled rectifier which interrupts the circuit until a secondary electrical power supply fires it, that is, causes it to close the circuit. A terminal 74 of the thyristor switch is connected with the positive terminal of the battery 60 through the pyrotechnic device 38. A terminal 70 of the thyristor switch is electrically connected with the conductor plate 68 and further with the negative terminal of the battery 60, said latter connection being provided through a biasing resistor 72 to limit the electrical potential between the terminals 70 and 104 of the thyristor switch 64, and to prevent it from becoming energized without the conductors 66 and 68 being immersed in water.

The conductor plates 66 and 68 are spaced apart such that the potential of the battery 60 is incapable of overcoming the resistance provided by the air gap between the conductor plates. If and when the conductor plates become immersed in water, the water acts as an electrolyte and electrically connects the conductor plates 66 and 68, causing an electrical potential between the terminals 70 and 74 of a sufficient magnitude to fire thyristor switch 64, thereby closing the circuit. The resulting electrical current energizes the squib 62 thereby detonating the pyrotechnic device 38.

In a presently preferred embodiment of the invention, the conductor plates 66 and 68 are constructed of dissimilar metals resulting in a galvanic element with an electric potential between the conductor plates. The conductor plates 66 and 68 are connected with the terminals of the battery 60 such that their potential opposes the potential of the battery. The effective potential between the conductor plates is thereby reduced, and the electron flow between the conductors due to a humid atmosphere which acts as a weak electrolyte is substantially reduced. The danger of a slow discharge of the battery while the device is stored is thereby substantially reduced.

Best results have been obtained by constructing conductor 66, which is connected to the positive terminal of the battery 60 through the squib or detonating device 62, of magnesium and by constructing conductor 68, which is connected to the negative terminal of the battery through resistor 72, of lead or a lead-plated metal. No significant electron flow between the conductor plates occurs and the battery is discharged at a much lower rate while the apparatus is stored. The service-free life of the battery is substantially prolonged.

Referring now to FIG. 3, the conductors 66 and 68 have a generally U-shaped configuration. A space 76 is thereby formed between each conductor plate and an insulating plate 78 which suitably mounts conductors 66 and 68. Should condensation of high humidity air cause water droplets to be deposited in the space 80 between the conductor plates 66 and 68, capillary action withdraws them to the space 76. Best results are obtained if the distance between the conductor and the insulating plate is about $\frac{1}{32}$ of an inch. Accidental accumulation of water in space 80, which might electrically connect the conductors causing a slow discharge of the battery or an accidental detonation of the pyrotechnic device 38, is thereby avoided.

Referring now to FIGS. 1 and 2, the installation of the insulating base 78 which mounts the conductor plates 66 and 68 and the thyristor switch 64 in a chamber 82 of the emergency actuator is described. The body 10 is provided with a rectangular portion 84 against which the insulating plate 78 rests. The body is further provided with bosses 85 that receive machine screws 86 which hold a cover plate 88. The insulating base 78 includes elongated slots 90 to accommodate the screws 86 which hold the cover plate 88. The insulating base 78 is firmly pressed against the rectangular portion 84 and held in place by the cover plate 88. The cover plate 88 includes raised openings 92 to permit water to enter the chamber 82 when the actuator becomes immersed in water.

FIG. 3 schematically illustrates the electrical connections. Leads 96, 98, 100 and 102 provide the electric circuit from the positive terminal of the battery 60 through the squib or detonator 62 contained in the pyrotechnic device 38 to the negative terminal of the battery 60. This circuit is interrupted between terminals 74 and 104 of the thyristor switch 64. The circuit is closed by a sufficient electric potential between the terminals 70 and 74 of the thyristor switch 64. Such a potential is created by immersing conductor plates 66 and 68 in water whereby they become electrically connected.

Conductor plate 66 is connected to the positive terminal of the battery 60 by the leads 96 and 98, and conductor plate 68 is connected to the negative terminal of the battery by the leads 102, 106 and 108. Resistor 72 controls the magnitude of the electric potential created by the battery 60 and existing between the terminals 70 and 74 to prevent the thyristor switch from firing without the conductors being immersed in water. Immersion of the conductor plates in water electrically connects them which energizes thyristor switch 64 and closes the electric circuit, including the squib 62, between the terminals 74 and 104. The pyrotechnical device 38 is thereby detonated and the emergency equipment actuator is operated.

As best seen in FIG. 4, terminals 110, 111 and 112 are provided to permit functional testing of the apparatus without activating the pyrotechnic device. Terminal 110 is electrically connected with the positive terminal of battery 60; terminal 111 is electrically connected with conductor plate 66; and squib 62 and terminal 112 are electrically connected with the negative terminal of the battery.

A test meter 114 for functionally testing the apparatus is also shown in FIG. 4. The test meter may be of any suitable construction but preferably it is a combination "ohm" meter and "ampere" meter provided with a proper selector switch 116.

The terminals 110, 111 and 112 permit the functional testing of squib 62, of the conductor plates 66 and 68, and of the battery. To test the squib, meter 114 is switched to act as an ohmmeter and is connected with terminals 110 and 111. Connection of the ohmmeter measures the resistance of the squib whereby its proper condition can be ascertained. Should its resistance be too high or too low, a replacement squib can be installed to assure proper operation of the apparatus in case of an emergency.

Switch 116 of the meter is actuated to transform the meter into an amperemeter for testing the electric function of the conductor plates 66 and 68 when they are immersed in water. The meter is again connected with terminals 110 and 111. Upon immersion of the conductor plates in water, the electric current flowing between them is measured. The test reveals whether or not the water immersion of the conductor plates will fire the thyristor switch without actually firing it and without subjecting squib 62 to an energizing current and detonating the pyrotechnic device 38.

The charge of battery 60 is tested by applying a volt meter 118 to terminals 110 and 112. If the voltage drops below the minimum required for activating the squib 62, battery 60 can be replaced by a new one to assure operation of the apparatus in case of an emergency. Voltmeter 118 can be independent or can be incorporated in the combination ohm and ampere test meter 114. In the latter instance, the test meter includes a set-switch 120 to electrically connect the voltmeter with terminals 110 and 112.

Terminals 110, 111 and 112 are preferably disposed on the exterior of body 10, as best seen in FIG. 2, and they are positioned and electrically connected as schematically shown in FIG. 3. If the terminals are so located the apparatus is conveniently tested by applying male terminal connectors (not shown) of the test meter 114 to apertures (not shown) of the terminals 110, 111 and 112. Time-consuming disassembling operations, as by having to remove cover 88 to reach the terminals were they internally located, are thereby eliminated.

If the emergency apparatus of this invention is to be used in conjunction with emergency equipment requiring a time delay between the water immersion of the conductor plates 66 and 68 and actuation of the equipment, a time-delay circuit 122, shown in FIG. 5, is included. The time-delay circuit includes a second thyristor switch 124 which is fired by immersing conductor plates in water in a manner identical to the firing of the thyristor switch 64 described above. The resulting electric current, however, bypasses squib 62 and charges a capacitor 126 through a resistor 128. After the capacitor is charged to the break-over voltage of a unijunction transistor 130, the current from the second thyristor switch 124 flows through the unijunction transistor 130 and causes a first transistor switch 132 to fire. The first transistor switch is functionally identical to thyristor switch 64 in the embodiment of the invention having no time-delay function. Firing of the first transistor switch 132 energizes squib 62 whereby the pyrotechnic device 38 is detonated.

By selecting the proper capacitor 126, the time delay between the water immersion of the conductor plates 66 and 68 and the detonation of the pyrotechnic device 38, can be predetermined. Depending on the capacitance of the capacitor, the time delay can be varied to suit the particular application of the apparatus.

The energizing apparatus of this invention may be used in conjunction with emergency equipment other than gas inflated equipment. For example, it can be employed to release marking dies or to ignite flares. Such apparatus requires the closing of an electric circuit in response to its coming in contact with a body of water. Further, it can be directly connected with emergency or alarm equipment, e.g. an audible warning device, without the intermediate use of a secondary device such as the pyrotechnic device 38 described above.

What is claimed is:
1. A water-responsive energizing apparatus comprising electrically activated means for actuating emergency equipment, a source of electric power, an insulating base, a pair of spaced-apart conductor plates secured to the base and in electric connection with the source, a first thyristor switch for connecting the electrically activated means with the source in response to wetting of the conductor plates, and a resistor connected to the thyristor switch so that the switch is fired by the drop across the resistor when the conductor plates are wetted.

2. Apparatus according to claim 1 wherein at least a portion of the conductor plates is spaced apart from the insulating base.

3. An emergency equipment actuator comprising:
a body having a cartridge chamber and a piston chamber;
a reciprocable piston including a piercing pin disposed in the piston chamber;
a pyrotechnic device for reciprocating the piston toward the cartridge chamber;
a squib for activating the pyrotechnic device;
a source of electric power;
a pair of spaced-apart conductor plates in electric connection with the source and insulated from each other;

a thyristor switch for subjecting the squib to an electric current from the power source in response to immersing the conductor plates in water;

a terminal means located exteriorly of the body for applying a test meter to the actuator; and means for electrically connecting the terminal means with the source of electric power, a conductor plate and the squib such that the actuator can be tested without energizing the squib.

4. Apparatus according to claim 3 including time-delay means for delaying the thyristor switch from subjecting the squib to the electric current for a predetermined period of time after the conductor plates have been immersed in water.

5. Apparatus according to claim 3 wherein the conductor plates are mounted in an insulating base with at least portions of the conductor plates being spaced about 1/32 of an inch from the insulating plate and wherein one conductor plate is constructed of magnesium and connected with the positive terminal of the power source and the other conductor plate includes lead on its exterior surface and is connected to the negative terminal of the power source.

6. A water-responsive energizing apparatus comprising electrically activated means for actuating emergency equipment, a source of electric power, an insulating base, a magnesium conductor plate connected with the positive terminal of the power source, a second conductor plate including lead on its exterior surface and spaced apart from the magnesium conductor plate, the second plate being connected to the negative terminal of the power source, the conductor plates being spaced from the insulating base about 1/32 of an inch, and a first thyristor switch and resistor in series for connecting the electrically activated means with the source in response to immersing the conductor plates in water.

7. A water-responsive energizing apparatus comprising electrically activated means for actuating emergency equipment, a source of electric power, an insulating base, a pair of spaced-apart conductor plates secured to the base and in electric connection with the source, a first thyristor switch and resistor in series for connecting the electrically activated means with the source in response to immersing the conductor plates in water, and test terminals for testing the responsiveness of the electrically activated means, for testing the electric connection of the conductor plates when immersed in water, and for testing the adequacy of the electric power source without activating said means.

8. Apparatus according to claim 7 wherein the terminals are exterior of the means.

9. Apparatus according to claim 7 wherein the power source is a battery and wherein one terminal is connected with a positive terminal of the battery, one terminal is connected with a negative terminal of the battery and one terminal is simultaneously connected with one of the conductor plates and the electrically activated means.

10. A water-responsive energizing apparatus comprising electrically activated means for actuating emergency equipment, a source of electric power, an insulating base, a pair of spaced apart conductor plates secured to the base and in electric connection with the source, a first thyristor switch for connecting the electrically activated means with the source in response to immersing the conductor plates in water, a second thyristor switch in electric connection with the conductor plates such that immersion of the conductor plates causes the second thyristor switch to fire, and means in electric connection with the first thyristor switch for delaying firing of the first thyristor a predetermined period of time after the second thyristor switch has fired.

References Cited
UNITED STATES PATENTS

| | | | |
|---|---|---|---|
| 2,393,985 | 2/1946 | Grant et al. | 222—5 |
| 3,059,814 | 10/1962 | Poncel et al. | 222—5 |
| 3,187,949 | 6/1965 | Mangel | 222—504 X |
| 3,341,073 | 9/1967 | Arps et al. | 222—76 X |

ROBERT B. REEVES, *Primary Examiner.*

H. S. LANE, *Assistant Examiner.*

U.S. Cl. X.R.

9—318